United States Patent [19]

Kondo et al.

[11] 3,970,621

[45] July 20, 1976

[54] POWDER COATING COMPOSITION FOR ELECTRODEPOSITION

[75] Inventors: Taizo Kondo; Komaharu Matsui; Kunio Yamamoto, all of Hiratsuka, Japan

[73] Assignee: Kansai Paint Company, Ltd., Japan

[22] Filed: Sept. 11, 1974

[21] Appl. No.: 505,033

Related U.S. Application Data

[63] Continuation-in-part of Ser. No. 211,660, Dec. 23, 1971, abandoned.

[30] Foreign Application Priority Data

Dec. 26, 1970  Japan.............................. 45-118724

[52] U.S. Cl............................ 260/18 EP; 204/181; 260/29.2 EP; 260/29.6 XA; 260/29.6 F; 260/29.6 MH; 260/29.6 PM; 260/29.6 ME; 260/29.6 MQ; 260/29.6 T; 260/29.6 NR; 260/837 R

[51] Int. Cl.²................. C08L 63/02; C25D 13/06; C25D 13/10

[58] Field of Search................. 260/29.2 EP, 18 EP; 204/181

[56] References Cited

UNITED STATES PATENTS

| | | |
|---|---|---|
| 2,968,575 | 1/1961 | Mallonee..................... 260/29.2 TN |
| 3,445,272 | 5/1969 | Newton.............................. 117/119 |
| 3,476,668 | 11/1969 | Scheiber et al..................... 204/181 |
| 3,505,169 | 4/1970 | Parker............................... 162/151 |
| 3,531,390 | 9/1970 | Lebras............................... 204/181 |

Primary Examiner—Wilbert J. Briggs, Sr.
Assistant Examiner—A. H. Koeckert
Attorney, Agent, or Firm—Ostrolenk, Faber, Gerb & Soffen

[57] ABSTRACT

A powder coating composition for electrodeposition which comprises powdery particles having 0.1 to 50 microns particle size wetted with an organic solvent having a boiling point of 50° to 250°C in a range of 5 to 100 parts by weight per 100 parts by weight of the powdery particles in said powder coating composition and dispersed in an aqueous medium containing a surface active agent of 0.05 to 5 parts by weight per 100 parts by weight of the powdery particles in said powder coating composition to be dispersed, in which said organic solvent does not dissolve the organic high molecular weight compound in said powder coating composition and is scarcely soluble with said aqueous medium which is water or a mixture of water and water soluble organic solvents.

9 Claims, No Drawings

POWDER COATING COMPOSITION FOR ELECTRODEPOSITION

This invention relates to a powder coating composition for an electrodeposition.

Further, the present invention relates to a powder coating composition for the electrodeposition which comprises an aqueous dispersion of fine powder of organic high molecular weight compounds.

Still further, the present invention relates to a powder coating composition for electrodeposition which is excellent in throwing powder, that is, by using the powder coating composition of the invention in electrophoretic coating processes, uniform coatings can be formed even on the reverse surface an anode which is not opposite to each electrode, and the surface of the anode which is opposite to each electrode.

The powder coating composition for electrodeposition which is prepared by suspending the powdery organic high molecular weight compounds in water, organic solvents or mixtures thereof, is heretofore generally known. However, they are inferior with respect to throwing powder as compared with the electrodeposition coatings of the water soluble or dispersible coating composition in the prior art. One of the disadvantages in the throwing powder that is, the inferior formation of the coating on the reverse surface not opposite to each electrode or on the surface in a complicated shape, is considered to be caused by the fact that the electric resistance of the deposited coating cannot be increased owing to the existence of water and other electroconductive materials between the deposited powdery coating particles. Therefore, the powder coating composition could not be practically employed on account of its inferior throwing powder in electrophoretic coating processes. However, varieties of organic high molecular weight compounds can be used for all their several characteristic advantages; a coating film having more than 100 microns in thickness, in some cases 300 microns in thickness, can be formed, whereas in case of electrodeposition of water soluble or dispersible materials, a coating film of only 50 microns in thickness at the most is formed; the time required for the electrodeposition is reduced; and the obtained coating is superior in water resistance because it is not necessary to introduce hydrophobic groups in the organic high molecular weight compound which are required in the electrodeposition of water soluble or dispersible materials of the prior art.

The term "throwing power" herein used means the degree of the formation of the electrodeposited coating film on the front and base surfaces of an article to be coated. When differences between the thickness of the electrodeposited coating film on the surface which is opposite to each electrode and of the electrodeposited coating film on the reverse surface is small, or when the electrodeposited coating film on this reverse surface of the article is uniformly formed, throwing power is good or excellent.

As the result of the Inventors' eager investigation in order to eliminate the aforementioned defects, it was found that the throwing power of the powder coating composition for the electrodeposition can be improved very much by wetting the fine powdery particles consisting of the organic high molecular weight compounds as a main component with using a certain organic solvent, and in addition, a smooth coating film can be obtained by baking the deposited layer and the formed coating film is excellent both in mechanical and chemical properties.

A powder coating composition for electrodeposition in the present invention which comprises powdery particles for a powder coating composition having 0.1 to 50 microns particle size wetted with organic solvent having a boiling point of 50° to 250°C in a range of 5 to 100 parts by weight per 100 parts by weight of the powdery particles in said powder coating composition and dispersed in an aqueous medium containing a surface active agent of 0.05 to 5 parts by weight per 100 parts by weight of the powdery particles in said powder coating composition to be dispersed, in which said organic solvent does not dissolve the organic high molecular weight compound in said powder coating composition and the powder is scarcely soluble with said aqueous medium which is water or a mixture of water and water soluble organic solvents. That is, the particles of said organic compounds are wetted with the organic solvents, and then the particles are suspended in the aqueous medium containing surface active agent to form the powder coating composition of the present invention. In the composition of the present invention, the characteristic advantages of the powder coating composition for the electrodeposition are maintained, while the throwing power of the composition is improved. Thus the difficulties in the electrophoretic coating of the powder coating composition for practical uses have been overcome.

As the organic high molecular compounds being used in the present invention, resins which are ordinarily used for the powder coating composition can be utilized. For example, polyolefine, epoxy resin, polyvinyl chloride, polyester, acrylic resin, and polyvinylidene fluoride are typical. The epoxy resins are commercially available bis-phenol A type resins derived from epichlorohydrin and bis-phenol A. These resins are pulverized into 0.1 to 50 microns particle size, and particles in the range of 1 to 20 microns are preferable for practical uses. It is difficult to obtain particles of less than 0.1 micron in diameter through the usual method, and in case of particles of more than 50 microns in diameter, it is difficult to keep the electrodepositing bath in the state of a stable suspension and a precipitate of the particles is liable to form, and, in addition, the thickness of the formed coating film becomes unnecessarily large. Therefore the particle size in the aforementioned range is most suitable. Further, as pigments and other additives to be mixed into said organic high molecular weight compounds, the ordinarily known additives such as pigments including extender pigments and coloring pigments may be used.

As organic solvents to wet the particles for the powder coating composition of the present invention, which do not dissolve the powdery particles for the powder coating composition and are nearly insoluble with the aqueous medium, those having a boiling point of 50° to 250°C can be used. For example, hydrocarbon (hydrocarbon halides and nitro-hydrocarbons being included), alcohol, ketone, ester and ether solvents can be used, however, each must be used properly according to the kind of organic high molecular weight compound used. For example, for powdery particles using epoxy resin as a vehicle, one or a mixture of hydrocarbon solvents such as hexane, heptane, isooctane, mineral spirits, naphtha, cyclohexane, tetrahydronaphthalene, decahydronaphthalene and kerosene can be used;

for powdery particles using polyvinyl chloride as a vehicle, one or a mixture of hydrocarbon solvents such as toluene, xylene, cyclohexane, tetrahydronaphthalene and decahydronaphthalene, hydrocarbon halide solvent such as trichloroethylene, and alcohols such as amyl alcohol, hexyl alcohol, heptyl alcohol, octyl alcohol and cyclohexanol can be used; for powdery particles using polyester as a vehicle, one or a mixture of hydrocarbon solvents such as hexane, heptane, isooctane, mineral spirits, naphtha, and kerosene, and alcohols such as amyl alcohol, hexyl alcohol, heptyl alcohol, octyl alcohol, and cyclohexanol can be used; for powdery particles using acrylic resins as a vehicle, one or a mixture of hydrocarbon solvents such as hexane, heptane, isooctane, mineral spirits, naphtha, cyclohexane, tetrahydronaphthalene, decahydronaphthalene and kerosene can be used.

Further, for powdery particles using polyolefin as a vehicle, one or a mixture of hydrocarbon solvents such as benzene, toluene, xylene, tetrahydronaphthalene, decahydronaphthalene and hydrocarbon mixture solvent, ketones such as methyl ethyl ketone, methyl isobutyl ketone, diisobutyl ketone, cyclohexanone and isophorone, esters such as ethyl acetate, butyl acetate, octyl acetate, amyl acetate, methyl amyl acetate and cellosolve acetate, and alcohols such as amyl alcohol, hexyl alcohol, heptyl alcohol, octyl alcohol and cyclohexanol can be used; for powdery particles using polyvinylidene fluoride as a vehicle, one or a mixture of hydrocarbon solvents such as benzene, toluene, o-dichlorobenzene, n-heptane, isooctane, kerosene and turpentine, and esters such as ethyl acetate and butyl acetate can be used.

The amount of the organic solvent to be used is 5 to 100 parts by weight per 100 parts by weight of the powdery particles in the powder coating composition, and the range of 20 to 60 parts by weight of the solvent is most preferable. When the amount of the organic solvent is less than 5 parts by weight, the prominent effect in improvement of the throwing power, which is the principal object of the invention, cannot be achieved. When the amount is more than 100 parts by weight of solvent being used, a coating film having a sufficient thickness cannot be obtained for a certain supply of the electric power because the content of the organic solvent becomes larger in the deposited film, as compared with the case in which the organic solvent of less than 100 parts by weight is used. Further, since a larger amount of the surface active agent must be used in order to disperse an organic solvent of more than 100 parts by weight into the aqueous medium, the coated film obtained has the faults of discoloration, pin-holes and craters.

In a suspension consisting of only a mixture of the particles, water soluble organic solvent and aqueous medium, the particles in the suspension are moved toward the electrode which has the charge opposite to the charge of said particles when the electric field is imposed on the bath, however, the velocity of the electrodeposition is low, and the adherence of the particles to the electrode is very weak. Therefore, the deposited film cannot be obtained since the deposited particles are peeled off from the article when this article (electrode) is lifted out of the bath. Further, an organic solvent which mixes with water and is scarcely dissolved in water, therefore such suspension cannot be used for the electrodeposition of the powder coating composition for the above-mentioned reasons because water existing between the deposited powdery coating particles is electroconductive and as a result, throwing power is lowered. Accordingly, in the present invention, surface active agents are used in order to give the electric charge to the wetted particles, and to facilitate the dispersion of the particles in the aqueous medium, thereby and the electrodeposition coating can be proceeded smoothly. The amount of the surface active agent to be used may be in the range of 0.05 to 5 parts by weight per 100 parts by weight of the powdery particles in the powder coating composition. If the amount of the surface active agent is less than 0.05 parts by weight, the particles of the powder coating composition cannot be dispersed satisfactorily into the aqueous medium, and more than 5 parts by weight of the agent is not desirable because it causes faults in the coating such as discoloration, craters and pin-holes. As surface active agents, the anionic active agents and nonionic active agents can be used, however, it is not preferable that the cationic active agents be used. As the anionic surface active agents, one or a mixture of fatty acid alkali metal salts having from 8 to 22 carbon atoms, alkylsulfates in which the alkyl group has from 8 to 18 carbon atoms, alkylsulfonates in which the alkyl group has from 8 to 18 carbon atoms, alkylarylsulfonates in which the alkyl group has from 8 to 18 carbon atoms and polyethylene glycol alkyl ether sulfonates in which polyethylene is lower than hexaethylene and the alkyl group is from 8 to 18 carbon atoms can be used. As nonionic surface active agents, one or a mixture of polyoxyethylene alkyl ethers in which there are from 8 to 15 oxyethylene units and the alkyl group is from 8 to 18 carbon atoms and polyoxyethylene alkyl esters in which there are from 5 to 30 oxyethylene units and the alkyl group is from 8 to 18 carbon atoms may be used. In use, the surface active agent can be added previously to the aqueous medium or be added afterward.

The aqueous medium of the present invention is water only or a mixture of water and water soluble organic solvents. The water soluble organic solvents are of use for the dispersion of the powder coating composition. As for such solvents, alcohols, ethers, ketones and esters may be exemplified. For example, one or a mixture of alcohols such as methyl alcohol, ethyl alcohol, propyl alcohol, isopropyl alcohol, butyl alcohol and propylene glycol; ethers such as ethylene glycol monomethyl ether, ethylene glycol monoethyl ether and ethylene glycol monobutyl ether; ketones such as acetone, diacetone and methylethyl ketone; and ester such as ethyl acetate, propyl acetate, methyl acetate, amyl acetate, methyl acetate and methyl carbitol acetate, can be used. The water soluble organic solvents are used alone or as a mixture in the range of less than 90% by weight.

In the present invention, the conditions for the electrophoretic deposition are as follows:
Concentration of the composition in the bath: ca. 5–20% by weight
Bath temperature: ca. 15°–40°C
Applied voltage: 100–400 volts.

In operation, when good throwing power is desired, supply of a relatively higher voltage is preferred.

As compared with the ordinary electrodeposition bath using the ordinary power coating material, the bath using the powder coating composition of the present invention has excellent throwing power, the reason for which is considered to be that the electrical resistance of the deposited film becomes large by the use of the powdery particles wetted with the organic solvent. That is, the particles which are wetted with the organic solvent are deposited on the surface of the article to be coated as the anode to form a coating film. In the course of the electrodeposition of the coating film, the organic solvent which the particles contact and which unite one with another, acts to exclude the water contained as the aqueous medium from the deposited film. Therefore, the electric conductivity between the deposition bath and the article to be coated is lost, the electric resistance of the deposited film is increased, the wetted particles are electrodeposited on the part of article as an anode which is yet electrodeposited, and, thus, the throwing power can be improved. The water content of the deposited film is thereby decreased, and accordingly, the particles of the coating material can be smoothly and densely deposited on the surface of the article to form a desirable coating film. The organic solvent used is volatile so that it can be evaporated by leaving the treated article at the room temperature or by heating the article at a temperature of 50° to 150°C. The dried article is then baked to form a finished coating which has excellent physical and chemical properties and has no undesirable defects such as discoloration, craters and pin-holes. The coating film obtained in the present invention is likewise good in the finished surface as compared with those obtained by the other powder coating method such as electrostatic coating method, and therefore, the characteristic of the powder coating method can be fully attained. Further, in the prior art, it is believed that the coating obtained through electrodeposition is inferior in water resistance, while the powder coating composition obtained by the present invention is superior in water resistance as the water content thereof is very low. Still further, in the ordinary methods, the electrodeposition bath must always be stirred to prevent the particles from precipitation when particles of more than 5 microns in diameter are used. However, in the method of the present invention, the particles of the composition do not easily precipitate because the gross specific gravity of the particles is decreased by using an organic solvent which is less than 1.00 in the specific gravity, and accordingly, the control of the electrodeposition bath is very simple.

The composition of the present invention has an excellent throwing power, and therefore, it can be utilized for the coating of articles having complicated shapes or concave portions which have not been applied with good coatings by ordinary methods including electrodeposition coating. That is, the composition of the present invention can be used for the coatings of, for example, sheets, plates, steel bars such as C-shape steel and H-shape steel, steel pipes, joints, elbows, parts and accessories of machines and vehicles, and structural steels.

In the following, the objects and features of the present invention will be explained further by means of preparation examples and coating examples, in which parts or percent mean parts by weight or percent by weight, unless otherwise indicated.

PREPARATION EXAMPLE 1

Preparation of Epoxy Resin Powder

The following materials were weighed, and mixed well by fusing at 90° to 140°C for 10 minutes.

| Mixed Materials: | |
|---|---|
| Epikote No. 1001 (a trade name, an epoxy resin made by Shell Chemical Corporation) | 100 parts |
| Dicyandiamide (a hardener) | 6 parts |
| Rutile type titanium white (a pigment) | 20 parts |
| Bultvar B-79 (made by Monsanto Co.) as antisagging agent | 4 parts |
| Total: | 130 parts |

After the mixing, the mixture was cooled and pulverized such that the average particle size of the obtained powder was 10 to 20 microns. The composition of the present invention must be finely pulverized as compared with the powder for the ordinary electrostatic coating (from 50 to 200 microns). The same shall apply to the following Preparation Example 2.

PREPARATION EXAMPLE 2

Preparation of Polyester Resin Powder

The following materials were weighed and mixed well by fusing at 80° to 130°C for 20 minutes.

| Mixed Materials: | |
|---|---|
| Ester Resin No. 20 (a trade name, a thermoplastic polyester resin consisting of terephthalic acid, isophthalic acid, ethylene glycol and neopentyl glycol made by Toyobo Co., Ltd., Japan) | 80 parts |
| Epikote No. 1004 (a trade name, an epoxy resin made by Shell Chemical Corporation) | 20 parts |
| Red iron oxide (a pigment) | 20 parts |
| Modaflow (made by Monsanto Co.) as antisagging agent | 3 parts |
| Total: | 123 parts |

After the mixing, the obtained mixture was cooled and pulverized into fine particles, the average particle size of which was 10 to 20 microns.

PREPARATION EXAMPLE 3

Preparation of Acrylic Resin Powder

The following materials were weighed and mixed well by fusing at 80° to 139°C for 20 minutes.

| Mixed Materials: | |
|---|---|
| Acrylic resin for powder coating*[1] | 100 parts |
| Adipic acid | 6 parts |
| Titanium dioxide (rutile type) | 30 parts |
| Modaflow (as antisagging agent) | 1 part |
| Total: | 137 parts |

*[1]Granular solid copolymer resin consisting of styrene : methyl methacrylate : butyl acrylate : glycidyl methacrylate = 40 : 20 : 30 : 10 % by weight.

After the mixing, the obtained mixture was cooled and pulverized into fine particles, the average particle size of which was 15 to 25 microns.

COATING EXAMPLE 1

Preparation of Electrodeposition Bath

The epoxy resin powder, in an amount of 200 parts, prepared in Preparation Example 1 was wetted uniformly by dropping gradually 100 parts of mineral spirits therein.

The thus obtained wetted epoxy resin powder was suspended with stirring into an aqueous solution consisting of 1800 parts of de-ionized water and 2 parts (as solid) of potassium oleate soap.

Electrodeposition

The suspension thus obtained was put in a vessel made of polyvinyl chloride (length × width × depth: 100 × 150 × 200 mm), and a cold-finished steel plate (100 × 200 mm) was placed near the longer wall on one side and charged negatively. A zinc phosphate treated steel plate (70 × 150 × 0.8 mm) was placed 120 mm apart from said negatively charged plate, and was charged positively. Thereby, the electrodeposition coating was carried out with an electric voltage supply of 150 volts for 3 minutes.

Drying and Baking

The electrodeposited plate was dried for 20 minutes in a hot air dryer at 80°C to remove the mineral spirits and water from the deposited film, then and the plate was baked at 200°C for 15 minutes.

Thickness of Coating Film

The thickness of the coating film on the surface which faced to the electrode was 120 microns, and the thickness of the film on the reverse surface was 110 microns. Therefore, it will be understood that the throwing power of the composition of the present invention is excellent.

Comparison Test

For comparison, another electrodeposition coating and baking were carried out in the same manner as the above steps except that the powder of epoxy resin was not wetted by mineral spirits. The dried thickness of the obtained coating film on the surface which faced to the electrode was 180 microns, while on the reverse side of the plate, the peripheral 1 cm range was covered with a thin coating and a coating film was not formed at all on the central portion of the plate.

COATING EXAMPLE 2

Preparation of Electrodeposition Bath

The polyester resin powder, in an amount of 200 parts, prepared in Preparation Example 2 was wetted uniformly by dropping slowly 40 parts of hexane therein.

The thus obtained wetted polyester resin powder was suspended with stirring in an aqueous solution consisting of 1700 parts of de-ionized water, 100 parts of n-butyl alcohol and 2 parts (as solid) of potassium oleate soap.

Electrodeposition, Drying and Baking

The electrodeposition, drying and baking were carried out in the same manner as the foregoing Coating Example 1, except that the electric voltage was supplied for 2 minutes, the baking was at 180°C for 30 minutes.

Result

The thicknesses of the coating film as obtained was 70 microns on the electrode side and 65 microns on the reverse side which showed the excellent throwing power. The surface of the coating film was smooth and glossy.

Comparison Test

For comparison, another electrodeposition coating and baking were carried out in the same manner as the above steps except that the powder of polyester resin was not wetted by hexane. The dried thickness of the obtained coating film on the electrode side surface was 90 microns, while almost no coating was formed on the reverse surface.

COATING EXAMPLE 3 preparation of Electrodeposition Bath

The acrylic resin powder, in an amount of 200 parts, prepared in Preparation Examples was wetted uniformly by dropping gradually 100 parts of Isopar E (a mixture of aliphatic hydrocarbon solvent made by Esso) therein.

The thus obtained wetted acrylic resin powder was suspended with stirring in an aqueous solution consisting of 1800 parts of de-ionized water and 3 parts (as solid) of Demol EP (polycarboxylic acid type anionic surface active agent made by KAO-ATLAS Co., Ltd., Japan).

Electrodeposition, Drying and Baking

The electrodeposition, drying and baking were carried out in the same manner as the foregoing Coating Example 1, except that electric voltage supplied was 100 volts for 3 minutes, the baking was at 200°C for 25 minutes. The thickness of the coating film obtained was 105 microns on the electrode side and 95 microns on the reverse side.

COATING EXAMPLE 4–7

The preparations of electrodeposition bath were carried out in the same manner as the foregoing Coating Example 1, except that the ratio of the epoxy resin powder, mineral spirits and potassium oleate soap which are represented by weight parts was as in the following Table 1.

TABLE 1

| Coating Example No. | | 4 | 5 | 6 | 7*¹ |
|---|---|---|---|---|---|
| The epoxy resin powder prepared in Preparaton Example 1 | | 200 | 200 | 200 | 200 |
| Mineral spirits | | 20 | 60 | 180 | 250 |
| Potassium oleate soap | | 2 | 3 | 4 | 5 |
| Thickness of coating film | faced surface | 140 | 97 | 84 | 68 |
| | reverse surface | 54 | 65 | 72 | 57 |

*¹Coulomb yield is poor and the coating film obtained became discolored.

The electrodeposition, drying and baking were carried out in the same manner as the foregoing Coating Example 1, and the thickness of the coating film as obtained was shown in Table 1.

COATING EXAMPLE 8–12

The preparations of electrodeposition bath were carried out in the same manner as the foregoing Coating Example 1, except that the amount of potassium oleate soap which is represented by weight parts as solid was as in the following Table 2. The electrodeposition was carried out in the same manner as the foregoing Coating Example 1.

TABLE 2

| Coating Example No. | 8 | 9 | 10 | 11 | 12 |
|---|---|---|---|---|---|
| The epoxy resin powder prepared in Preparation Example 1 | 200 | 200 | 200 | 200 | 200 |
| Mineral spirits | 100 | 100 | 100 | 100 | 100 |
| Potassium oleate soap | 0 | 0.5 | 2.0 | 8.0 | 15.0 |
| Condition of bath | not dispersed | Good | Good | Good | Good |
| Film appearance | — | Good | Good | *1 | *2 |

*1 The coating film obtained became slightly discolored.
*2 The coating film obtained became discolored and had a large number of craters.

PROPERTIES OF COATING FILM

The coating films on the faced electrode side obtained in Coating Examples 1 to 3 were tested in respect of the following properties. For comparison, the articles coated by the known electrostatic powder coating method and by using powdery particles obtained in Preparation Examples 1 to 3 were tested. The results were shown in the following Table 3.

TABLE 3

| Items | Type of vehicle Coating method and coating compositions methods of test | Epoxy resin Electro-deposition (coating Example 1) | Epoxy resin Electrostatic coating (Preparation Example 1) | Polyester Electro-deposition (Coating Example 2) | Polyester Electrostatic coating (Preparation Example 2) | Acrylic resin Electro-deposition (coating Example 3) | Acrylic resin Electrostatic coating (Preparation Example 3) |
|---|---|---|---|---|---|---|---|
| Film thickness | — | — | 115 μ | — | 75 μ | — | 100 μ |
| Film appearance | — | Good | Good | Good | Good | Good | Good |
| Gloss | 60° specular gloss | 80 | 81 | 88 | 95 | 84 | 93 |
| Hardness | Pencil Hardness | 2H | 2H | H | H | 2H | 2H |
| Impact resistance | du Pont's Impact Tester (½"×500 g) | No crack at 50 cm | No crack at 50 cm | No crack at 10 cm | No crack at 10 cm | No crack at 20 cm | No crack at 30 cm |
| Moisture resistance | 200 hrs. at 40°C, 100% reactive humidity | No blistering | No blistering | Slightly blistering | Slightly blistering | No blistering | No blistering |
| Salt spray resistance | ASTM 8117-64 for 200 hrs | 1.5 mm | 1.0 mm | 5.0 mm | 5.0 mm | 2.0 mm | 2.0 mm |

PREPARATION EXAMPLE 4

The following material were weighed and mixed well by fusing at 90° to 140°C for 5 minutes

| Mixed Materials: | |
|---|---|
| Epikote No. 834 (a trade name, an epoxy resin made by Shell Chemical Corp.) | 30 parts |
| Epikote No. 1007 (a trade name, an epoxy resin made by Shell Chemical Corp.) | 70 parts |
| Dicyandiamide (a hardener) | 6 parts |
| Rutile type titanium white (a pigment) | 50 parts |
| Modaflow (a trade name, antisagging agent made by Monsanto Chemical Co.) | 1 part |
| | Total: 157 parts |

After the mixing, the mixture was cooled and pulverized into fine particles, the average particle size of which was 10 to 20 microns.

PREPARATION EXAMPLE 5

The following materials were weighed and mixed well by fusing at 90° to 130°C for 5 minutes.

| Mixed Materials: | |
|---|---|
| Epikote 1001 (a trade name, an epoxy resin made by Shell Chemical Corp.) | 30 parts |
| Epikote 1004 (a trade name, an epoxy resin made by Shell Chemical Corp.) | 50 parts |
| Ketone Resin N (a trade name, a keton resin made by Badische Anilin- & Soda-Fabrik AG) | 20 parts |
| Rutile type titanium white (a pigment) | 30 parts |
| Red iron oxide (a pigment) | 10 parts |
| Carbon black (a pigment) | 0.2 part |
| Butvar B-79 (a trade name, an antisagging agent made by Monsanto Chemical Co.) | 3 parts |
| Dicyandiamide (a hardener) | 5 parts |
| | Total: 148.2 parts |

After the mixing, the mixture was cooled and pulverized into fine particles, the average particle size of which was 10 to 20 microns.

PREPARATION EXAMPLE 6

The following materials were weighed and mixed well by fusing at 90° to 140°C for 5 minutes.

Mixed Materials:
| | |
|---|---:|
| Araldite 6084 (a trade name, an epoxy resin made by Ciba-Geigy AG) | 50 parts |
| Adduct No. 989 (a trade name, a blocked isocyanate made by VEBA-Chemie AG) | 50 parts |
| Rutile type titanium white (a pigment) | 50 parts |
| Silicon oil (a leveling agent) | 0.3 part |
| Total: | 150.3 parts |

After the mixing, the mixture was cooled and pulverized into fine particles, the average particle size of which was 10 to 20 microns.

COATING EXAMPLE 13

Preparation of Electrodeposition Bath

The epoxy resin powder, in an amount of 200 parts, prepared in Preparation Example 4 was wetted uniformly by dropping gradually 100 parts of mineral spirit therein.

The thus obtained wetted epoxy resin powder was suspended with stirring into an aqueous solution consisting of 1800 parts of de-ionized water and 2 parts (as solid) of potassium oleate soap.

Electrodeposition, Drying and Baking

The electrodeposition, drying and baking were carried out in the same manner as the foregoing Coating Example 1, except that the electric voltage was supplied for 2 minutes, the baking was at 180°C for 30 minutes.

Result

The thicknesses of the coating film obtained was 70 microns on the electrode side and 65 microns on the reverse side which showed the excellent throwing power. The surface of the coating film was smooth and glossy.

COATING EXAMPLE 14

Preparation of Electrodeposition Bath

The epoxy resin powder in the amount of 200 parts as prepared in Preparation Example 5 was wetted uniformly by dropping gradually 100 parts of mineral spirit therein.

The thus obtained wetted epoxy resin powder was suspended with stirring into an aqueous solution consisting of 1800 parts of de-ionized water and 2 parts (as solid) of potassium oleate soap.

Electrodeposition, Drying and Baking

The electrodeposition, drying and baking were carried out in the same manner as the foregoing Coating Example 1, except that the electric voltage was supplied for 90 seconds, the baking was at 180°C for 30 minutes.

Result

The thicknesses of the coating film obtained was 60 microns on the electrode side and 50 microns on the reverse side which showed the excellent throwing power. The surface of the coating film was smooth and glossy.

COATING EXAMPLE 15

Preparation of Electrodeposition Bath

The epoxy resin powder in the amount of 200 parts as prepared in Preparation Example 6 was wetted uniformly by dropping gradually 100 parts of mineral spirit therein.

The thus obtained wetted epoxy resin powder was suspended with stirring into an aqueous solution consisting of 1800 parts of de-ionized water and 2 parts (as solid) of potassium oleate soap.

Electrodeposition, Drying and Baking

The electrodeposition, drying and baking were carried out in the same manner as the foregoing Coating Example 1, except that the electric voltage was supplied for 60 seconds, the baking was at 180°C for 30 minutes.

Result

The thicknesses of the coating film obtained was 40 microns on the electrode side and 35 microns on the reverse side which showed the excellent throwing power. The surface of the coating film was smooth and glossy.

Properties of coating film

The coating films on the faced electrode side obtained in coating Examples 13 to 15 were tested with respect to their following properties. The results are shown in the Table 3.

TABLE 3

| Items | Type of vehicle Coating method and coating compositions Methods of test | Electro- deposition (coating Example 1) | Epoxy resin (coating Example 13) | (coating Example 14) | (coating Example 15) | Electrostatic coating (Preparation Example 1) |
|---|---|---|---|---|---|---|
| Film Thickness | — | — | — | — | — | 115 μ |
| Film Appearance | — | Good | Good | Good | Good | Good |
| Gloss | 60° specular gloss | 80 | 85 | 85 | 90 | 91 |
| Hardness | Pencil Hardness | 2H | 2H | 2H | H | 2H |
| Impact Resistance | du Pont's Impact Tester (½"×500g) | No crack at 50 cm | No crack at 50 cm | No crack at 50 cm | No crack at 40 cm | No crack at 50 cm |
| Moisture Resistance | 200 hrs. at 40°C, 100% relative humidity | No blistering | No blistering | No blistering | No blistering | No blistering |
| Salt spray | ASTM B117-64 | | | | | |

TABLE 3-continued

| Items | Coating method and coating compositions Methods of test | Type of vehicle | Epoxy resin | | | Electrostatic coating |
|---|---|---|---|---|---|---|
| | | Electro-deposition (coating Example 1) | (coating Example 13) | (coating Example 14) | (coating Example 15) | (Preparation Example 1) |
| Resistance | for 200 hrs. | 1.5 mm | 2 mm | 2 mm | 3.0 mm | 1.0 mm |

What is claimed is:

1. An aqueous powder coating composition for electrodeposition which comprises powdery particles of an epoxy resin from bisphenol and epichlorohydrin powder coating composition having 0.1 to 50 microns particle size wet with an organic liquid which does not dissolve the powdery particles and is essentially insoluble in the aqueous composition and which has a boiling point of 50°–250°C. in an amount of 5–100 parts of organic liquid by weight per 100 parts by weight of the powdery particles, said wet powdery particles dispersed in an aqueous medium containing 0.05–5 parts by weight per 100 parts by weight of the powdery particles of an ionic surface active agent.

2. A powder coating composition for electrodeposition according to claim 1, in which said epoxy resin is wett with at least one member selected from the group consisting of hexane, heptane, isooctane, mineral spirits, naphtha, cyclohexane, tetrahydronaphthalene, decahydronaphthalene and kerosene.

3. The powder coating composition of claim 1 wherein said aqueous medium is water or a mixture of water and a water soluble organic solvent.

4. A powder coating composition for electrodeposition according to claim 3, in which said water soluble organic solvent is at least one member selected from the group consisting of methyl alcohol, ethyl alcohol, propyl alcohol, isopropyl alcohol, butyl alcohol, propylene glycol, ethylene glycol monomethyl ether, ethylene glycol monoethyl ether, ethylene glycol monobutyl ether, acetone, diacetone, methylethyl ketone, ethyl acetate, propyl acetate, methyl acetate, amyl acetate, methyl cellosolve acetate and methyl carbitol acetate, and is used in the range of less than 90 % by weight.

5. A powder coating composition for electrodeposition according to claim 1, in which said powdery particles wett with organic liquid and a pigment are suspended in a range of about 5 to about 20 % by weight into the aqueous medium.

6. A powder coating composition for electrodeposition according to claim 1, in which said surface active agent is at least one member selected from the anionic surface active agents consisting of fatty acid alkali metal salts, alkylsulfates, alkylsulfonates, alkylarylsulfonates and polyethylene glycol alkyl ether sulfonates.

7. A powder coating composition for electrodeposition according to claim 1, in which said powdery particles wet with organic liquid is at a concentration of about 5 to about 20 % by weight in the electrophoretic deposition bath.

8. The powder coating composition of claim 1 wherein said powdery particles are wet with an organic liquid in the amount of 20–60 parts by weight per 100 parts of the powdery particles.

9. The powder coating composition of claim 1 wherein the organic liquid is mineral spirits.

* * * * *